Patented Oct. 14, 1930

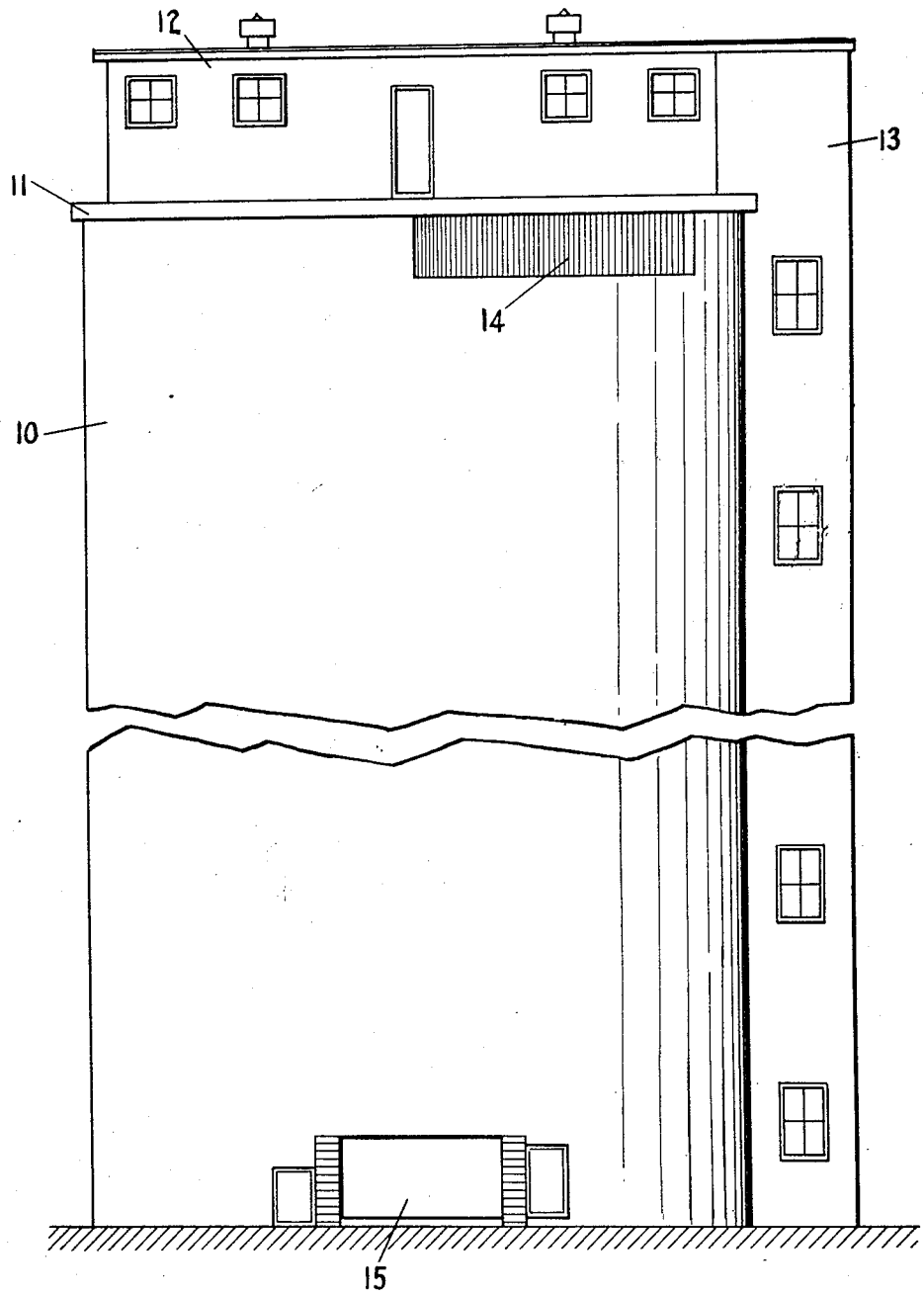

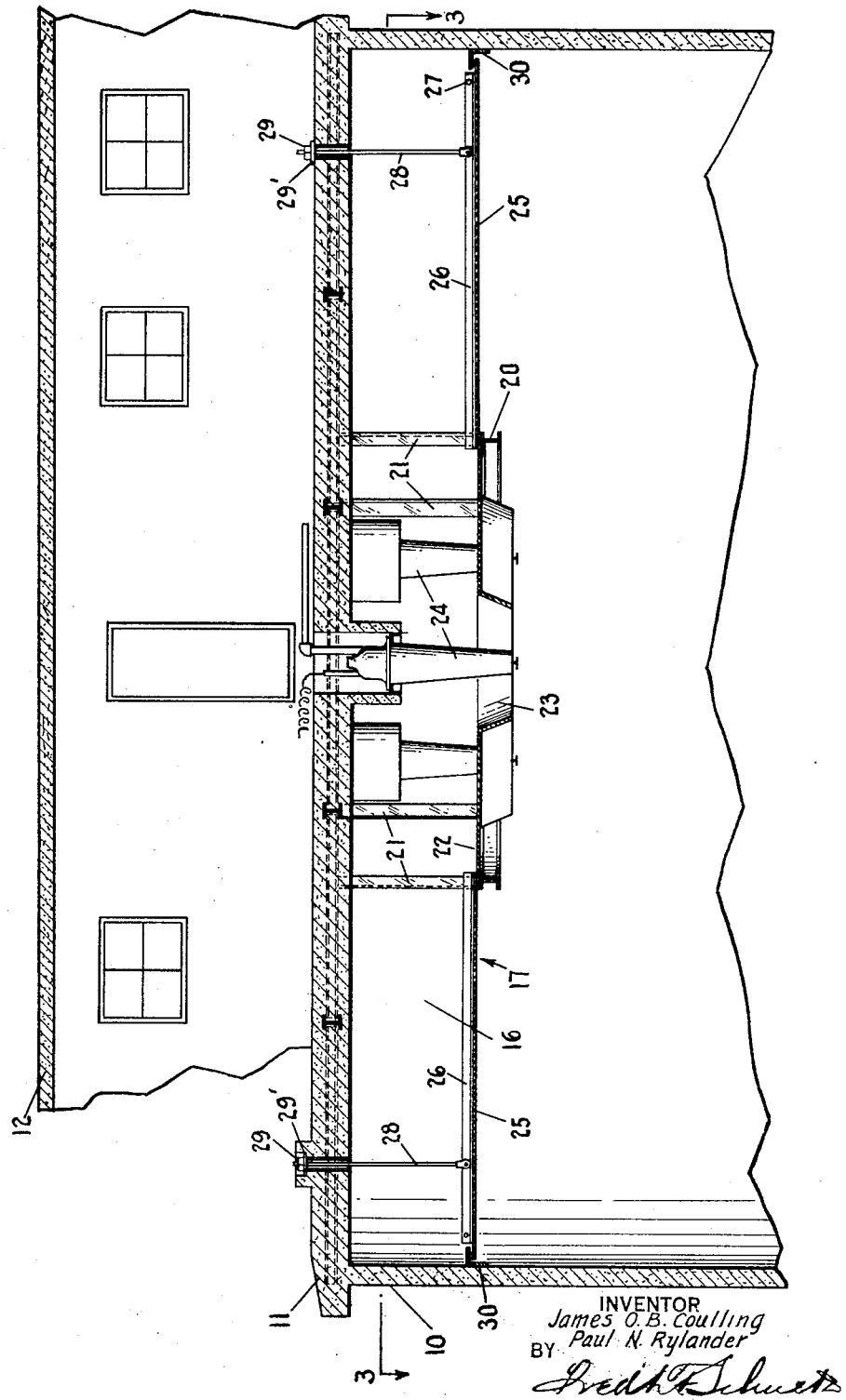

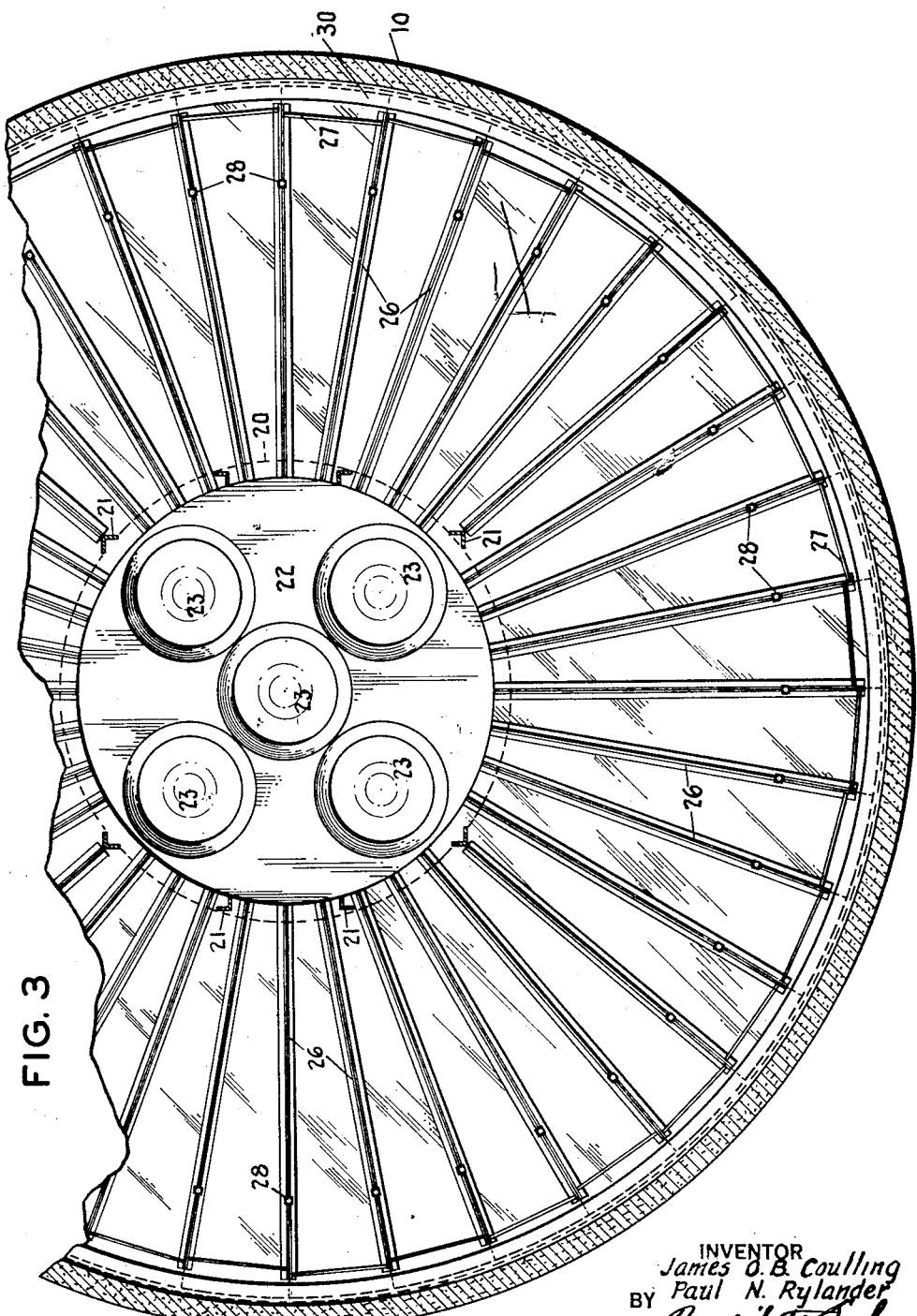

1,778,310

UNITED STATES PATENT OFFICE

JAMES O. B. COULLING, OF FLUSHING, AND PAUL N. RYLANDER, OF PELHAM, NEW YORK, ASSIGNORS TO OTATO CORPORATION, OF NEW YORK, N. Y., A CORPORATION OF DELAWARE

DESICCATING APPARATUS

Application filed December 5, 1929. Serial No. 411,789.

The invention relates to desiccating apparatus, more particularly of the tower type wherein there is introduced into the top of said tower a solid-containing liquid in finely divided state together with a suitable desiccating gaseous medium as for drying the solids thereof to a fine powder. It has for its object a novel form of closure means for the upper portion of the tower and more particularly in the arrangement for accommodating the effect of the relatively high temperatures to which the top of a tower is subjected by the incoming gaseous medium. The invention is especially adaptable to towers of large diameter and wherein the effects of expansion and contraction are very marked. A further object of the invention resides in the provision of means for suspending the closure member, or at least a part thereof, and of securing an adequate seal between the same and the wall of the tower.

In carrying out the invention to attain these various objects, the upper part of the tower is closed by a novel diaphragm or closure member having a suitable opening or openings for the introduction of the solid-containing liquid and the desiccating medium, said closure member, or at least a part thereof, being mounted for movement substantially axially of the tower as in flexing the same over its outer portion which is, furthermore, designed to cooperate with a sealing element mounted along the inner wall of the tower, suitable tensioning elements accessible exteriorly of the top being provided for suiting the degree of flexure of the closure member to the prevailing temperature conditions.

The nature of the invention, however, will best be understood when described in connection with the accompanying drawings, in which:

Fig. 1 shows in elevation a vertical form of desiccating tower.

Fig. 2 is a fragmentary vertical section and part elevation, on an enlarged scale, of the upper end of the tower and with portion broken away.

Fig. 3 is a fragmentary horizontal section on an enlarged scale of the tower, taken substantially on the line 3—3, Fig. 2 and looking in the direction of the arrows.

Referring to the drawings, 10 designates a vertical type of desiccating tower, preferably constructed of cylindrical form and of concrete, with concrete top 11 substantially sealing the tower. A superstructure of shelter 12 is provided at the top of said tower with enclosed approach 13. The gaseous desiccating medium enters the tower space through an inlet 14 just below the top 11 and passes out of said tower at the lower end through an outlet 15. The incoming gaseous medium enters first a distributing chamber 16 formed between the said top and a secondary top or closure member 17 located an appropriate distance below the top 11.

This closure member is preferably constructed in the nature of a diaphragm or cover with a centrally disposed rigid portion comprising, for example, an annular I-beam 20 fixedly secured to the concrete top 11 by the uprights 21, and a sheet metal cover 22 mounted over said beam and having one or more openings 23 therethrough to accommodate respective spray apparatus 24 or nozzles which project therethrough into the interior of the tower for delivering into the same the solid-containing liquid in finely divided condition. Sufficient space is left about the said liquid delivering means to admit of a flow of the desiccating medium past the same and also into the tower interior. These expedients are well known in the art and form no particular feature of the invention.

The complete sealing off of the chamber 16, however, is accomplished in a novel manner in that there is secured firmly to said beam 20 the inner end of a series of panels or sectors 25 of sheet metal thin enough to flex, as hereinafter set forth. These various panels may be united to form the sealing cover as by means of radially disposed angle pieces 26 attached to their upper surface and secured to each other, while at their outer ends tie rods 27 may be secured to the successive angle pieces.

The panels, furthermore, are designed to be supported intermediate the central and outermost portions of the closure member by means of tensioning rods 28 which are attached to the respective connecting angle pieces 26. Thus individual support and tensioning with flexure may be had of the closure member to move it more or less in an axial direction or longitudinally of the towers; and to this end, rods 28 extend through and beyond the top 11 where they are provided with holding nuts 29 and washers 29'. By suitably taking up on these rods the position of the panels may be adjusted vertically; and this is of particular importance in connection with the sealing of the closure member to the wall under the various temperature conditions prevailing in such towers. For example, an angle piece 30 may be secured along the inner face of the tower wall in substantially the horizontal plane of the closure member whose perimeter or edge, however, does not make contact with the said wall so as to allow for expansion but is located just below the overhanging side of the angle piece 30 with which it may be brought into contact, after temperature conditions have become constant, to effect a tight seal thereat merely by suitably tensioning the tension rods of the corresponding panels.

We claim:

1. In spray drying apparatus embodying a tower with means at its upper portion for the introduction of a gaseous desiccating medium and a solid-containing liquid in finely divided condition: a closure member for said upper tower portion and through which said desiccating medium and liquid are arranged to pass and means to effect movement of said closure member longitudinally of the tower.

2. In spray drying apparatus embodying a tower with means at its upper portion for the introduction of a gaseous desiccating medium and a solid-containing liquid in finely divided condition: a flexible diaphragm member for closing said upper tower portion and opened to admit of the introduction of said desiccating medium and liquid into the tower, and means to flex said diaphragm member.

3. In spray drying apparatus embodying a tower with means at its upper portion for the introduction of a gaseous desiccating medium and a solid-containing liquid in finely divided condition: a flexible diaphragm member for closing said upper tower portion and opened to admit of the introduction of said desiccating medium and liquid into the tower, means to effect a seal of the edge of said diaphragm member with the wall of the tower, and means to flex said diaphragm member.

4. In spray drying apparatus embodying a tower with means at its upper portion for the introduction of a gaseous desiccating medium and a solid-containing liquid in finely divided condition: a flexible diaphragm member for closing said upper tower portion and having a central rigid portion opened to admit of the introduction of said desiccating medium and liquid into the tower, and means to flex the outer portion of the diaphragm member.

5. In spray drying apparatus embodying a tower with means at its upper portion for the introduction of a gaseous desiccating medium and a solid-containing liquid in finely divided condition: a flexible disk member for closing said upper tower portion and having a central rigid portion opened to admit of the introduction of said desiccating medium and liquid into the tower, an angle piece secured to the inner wall of the tower substantially in the plane of the disk for overlapping and engagement with the edge thereof to effect a seal thereat, and means to flex the outer portion of the diaphragm member.

6. In spray drying apparatus embodying a tower sealed at the top: a secondary closure member located within the tower below said top and affording therewith a sealed chamber having an inlet for the gaseous desiccating medium, said secondary closure member admitting of the passage therethrough of said medium and a solid-containing liquid into the tower, and means to effect movement of said closure member longitudinally of the tower.

7. In spray drying apparatus embodying a tower with means at its upper portion for the introduction of a gaseous desiccating medium and a solid-containing liquid in finely divided condition: a flexible disk member for closing said upper tower portion and having a central rigid portion fixedly secured to the tower and opened to admit of the introduction of said dessicating medium and liquid into the tower, said disk member comprising a plurality of flexible panels fixed at their inner ends to the said central portion and extending substantially horizontally outwardly therefrom in proximity to the inner wall of the tower, means to secure the panels together to close off the upper portion of the tower, an angle piece secured to the inner wall of the tower for overlapping and engagement with the outer edges of the panels, and means to flex the said panels.

8. In spray drying apparatus embodying a tower with means at its upper portion for the introduction of a gaseous desiccating medium and a solid-containing liquid in finely divided condition: a flexible disk member for closing said upper tower portion and having a central rigid portion fixedly secured to the tower and opened to admit of the introduction of said desiccating medium and liquid into the tower, said disk member comprising a plurality of flexible panels fixed at their inner ends to the said central portion and extending substantially horizontally outwardly therefrom in proximity to the inner wall of the tower, means to secure the panels together to close off the upper portion of the tower, an angle piece secured to the inner wall of the tower for overlapping and engagement with the outer edges of the panels, and tensioning rods attached to the panels and extending through the top of the tower for flexing said panels.

9. In spray drying apparatus embodying a tower with means at its upper portion for the introduction of a gaseous desiccating medium and a solid-containing liquid in finely divided condition: a flexible disk member for closing said upper tower portion and having a central rigid portion fixedly secured to the tower and opened to admit of the introduction of said desiccating medium and liquid into the tower, said disk member comprising a plurality of flexible panels fixed at their inner ends to the said central portion and extending substantially horizontally outwardly therefrom in proximity to the inner wall of the tower, means to secure the panels together to close off the upper portion of the tower, an angle piece secured to the inner wall of the tower for overlapping and engagement with the outer edges of the panels, tensioning rods attached to the panels and extending through the top of the tower for flexing said panels, and means for drawing up said rods to vary the degree of flexure of the panels.

In testimony whereof we affix our signatures.

JAMES O. B. COULLING.
PAUL N. RYLANDER.